United States Patent [19]

Ankersmit

[11] 4,176,068
[45] Nov. 27, 1979

[54] METHOD FOR THE SEPARATION FROM EACH OTHER OF THE COMPONENTS OF A MIXTURE OF WATER, OIL AND DIRT (SLUDGE) AS WELL AS APPARATUS FOR PERFORMING SAID METHOD

[76] Inventor: Hendrik J. Ankersmit, Havendijk 177, Schiedam, Netherlands

[21] Appl. No.: 904,123

[22] Filed: May 8, 1978

[30] Foreign Application Priority Data

May 10, 1977 [NL] Netherlands ......................... 7705154

[51] Int. Cl.² ............................................. B01D 23/02
[52] U.S. Cl. ................................ 210/295; 210/532 R; 210/538
[58] Field of Search ...................... 210/65, 73.0 W, 83, 210/153, 247, 295, 305, 306, 416 R, 418, 420, 456, 519, 299, 513, 532 R, 538

[56] References Cited
U.S. PATENT DOCUMENTS 2,746,297  5/1956  Martin ................................... 210/456
3,499,533  3/1970  Lopker ................................. 210/456

FOREIGN PATENT DOCUMENTS 115370 12/1929 Austria .
685104  4/1964 Canada .

*Primary Examiner*—Frank Sever
*Attorney, Agent, or Firm*—Sughrue, Rothwell, Mion, Zinn and Macpeak

[57] ABSTRACT

A method and apparatus for separating into components a mixture of water, oil and sludge wherein the mixture is poured out of a downwardly-directed conduit onto the upper surface of a conically-shaped chamber having a discharge flow capacity at its lower end corresponding to the sludge volume content of the mixture. The oil and water are drawn off and conducted to a chamber formed at the lower surface of the conically-shaped chamber upon which the mixture was initially discharged. One or more filters are provided at the bottom portions of the second chamber to separate the oil and water.

9 Claims, 2 Drawing Figures

METHOD FOR THE SEPARATION FROM EACH OTHER OF THE COMPONENTS OF A MIXTURE OF WATER, OIL AND DIRT (SLUDGE) AS WELL AS APPARATUS FOR PERFORMING SAID METHOD

Method for the separation from each other of the components of a mixture of water, oil and dirt (sludge) as well as apparatus for performing said method.

The present invention relates to a method for separating from each other the components of a mixture of water, oil and dirt (sludge) which mixture is fed into a separating chamber within which the components on the basis of their differing physical properties are separated from each other such that the oil is collected at the top, below it the water is collected and below the water the sludge, each of said components being discharged from its relative level.

The invention also relates to an apparatus for performing said method, said apparatus comprising a container, a conduit for the supply of the mixture to be treated, a conduit for the discharge of oil separated and collected at the top of the container and a conduit for the discharge of the water separated and collected below the oil.

Up to the present, the separation of such a mixture of oil, water and sludge in its components, a mixture which for instance is formed by ballast water of vessels or is obtained in cleaning tankers, is performed in that the mixture is fed into a container in which it is left for a certain time so that in the natural way oil collects at the top of the water and sludge at the bottom of the container. Such a settling tank has a large volume to take up as much as possible of said mixture and has to be left at rest for some time to allow the separation to take place after which oil and water can be discharged.

However, it is not possible to obtain an excellent separation of the components of the mixture without further measures. One sided heating or cooling resulting from weather conditions generates a circulation of the mixture in the container which affects the best possible separation of the components. Against the influence of the heat of the sun, the container has to be isolated or cooled. Further structures can be mounted within the container which try to prevent such circulation.

Another large problem is formed by the separation of sludge from said mixture, which collects at the bottom of the container and which there forms a layer which is difficult to discharge, and which after each charging of the container with a new mixture increases in thickness. At a certain moment said layer has to be removed if one wants to keep the container in operation. This is a very difficult and work intensive task during which up to several thousands of tons of sludge have to be removed from the container. From environmental view-point it is impossible to discharge this sludge without more because this would cause large problems.

Deposition of sludge and coagulation of heavier oil parts lead to problems as well with the known 'through-flow' separators in which the mixture is not stored, but on its way through the separator is guided by means of baffles or through pipes or between plates and the like. During load chocks the deposited mass can be loosened again and torn along; when thinner fractions occur in the mixture to be cleaned heavier oil parts which were separated and coagulated are dissolved again in the thinner oils and taken away as yet. Also detergents can disturb the operation heavily.

Separators operating with air, centrifugal forces, fluctuation and the like have the disadvantage that, in the same way as the above mentioned apparatus, they are sensitive to the load and furthermore are not able to cover the entire area of the mixture of 1-100% oil in water.

Object of the invention is the provision of a method and an apparatus of the type mentioned in the beginning, by means of which the above mentioned objections of known methods and apparatus are avoided.

According to the invention this object is achieved by a method in which the mixture is poured from a downwardly directed conduit into a separating chamber which upwardly is widening and which at the lower end has a discharge made such that the flow capacity of said discharge corresponds to the sludge volume supply.

Why the method according to the invention leads to an excellent separation between sludge and lighter components is not entirely clear.

It is conceivable that a mixture of components having physically different properties can be separated in said components by feeding said mixture into an upwardly widening chamber such that in said chamber vortices are generated. Due to the fact that the space widens upwardly, the power of the vortices decreases upwardly. The heavy components (heavy sludge) have the tendency to collect in the small part of said chamber whereas the lighter components (oil, water and light sludge) are collected in that portion where the vortices are weaker and from which said components can rise. By continuously discharging heavy components from the narrow portion of the chamber, separation takes place between heavy components and lighter components, the latter rising in said chamber. The lightest component (the oil) will rise as far as possible and form a layer which is continuously discharged, while a quantity of mixture formed by light components (water, oil and light sludge) will collect between the upper side of said chamber and the layer of light components and is continuously discharged to undergo a further separating treatment.

It is also conceivable that the heavier components which move in the direction of the discharge, more easily penetrate into the discharge because the discharge is adapted to take up this quantity, whereas the lighter components are separated from the mass impinging upon the walls of the chamber and following their natural tendency escape in the upwardly widening portion of the chamber.

At any rate, the separation takes place dynamically which is contrary to the static methods according to the above mentioned state of art.

Contrary to the known settling which is a discontinuous method, the method according to the invention takes place continuously. On one side, there is continuous supply of mixture to be separated and on the other side there is continuous discharge of the components of the mixture to be separated to know oil, water, heavy sludge and light sludge. The advantages of said continuous method are that the volume of the container is considerably reduced because the entire quantity of mixture to be cleaned needs not to be taken up. Further the sludge does not get the opportunity to settle upon the bottom of the container. The sludge separated in heavy and light sludge is separated from the mixture and immediately continuously discharged. The quantity of sludge per unit of time as well as the entire quantity of sludge is considerably reduced by this. Because the volume of the container is considerably smaller and the volume of that part of the container in which the separation of water, oil parts and light sludge, takes place, only forms part of the volume of the container, it is sufficient to only partly isolate the container.

A further advantage with respect to the cited 'through flow' separators is, that the supply speed, the load chocks and the variations in mixture ratio within the mixture have no influence whatsoever upon the perfection of the separating process because the apparatus automatically adjusts itself without any control being necessary.

It will be evident, that with the method according to the invention an excellent separation of the components of the mixture can be obtained in an inexpensive and safe way. The quantity of sludge reduced to a small quantity per time unit can be processed without insurmountable environmental objections.

The apparatus for performing the above described method has the feature that the container is split up in a first and a second chamber, the bottom of the first chamber having one or more upwardly widening separating chambers into each of which debouches a supply conduit for the mixture to be treated, the narrow portion of said separating chambers having a discharge conduit connected to it for removing the heavy sludge, whereas above the level of the mouth of the supply conduits one or more conduits are provided connecting the first chamber and the second chamber for transferring the light fractions separated from the mixture from the first towards tha second chamber, said conduit or conduits debouching into said last mentioned chamber adjacent the upper side of a filter disc or package formed by a plurality of filter discs, said second chamber having conduits for the discharge of separated oil from the upper side of the filter disc or discs, for the discharge of cleaned water and for the discharge of sludge adjacent to the lower side of said filter disc or discs.

As shown, the container is divided into a first and a second chamber by a wall. In the first chamber the mixture is supplied to the separating chamber or chambers in each of which turbulence takes place due to which a first separation is performed in rising oil and descending heavy sludge and a mixture of water, oil and light sludge. Last mentioned mixture is fed towards the second chamber of the container from a point in the first mentioned chamber located above the mouth of the supply conduit and separated in its components in the second chamber. The oil, the cleaned water, the heavy sludge and the light sludge are continuously discharged from the container for further treatment if desired.

To increase the vortex effect of the separating chamber or chambers, it is preferred that each of the separating chambers has the shape of a cone having its top directed downwardly. Due to said measure the vortices are disturbed as less as possible, and no dead corners are formed.

It is however possible too that each of the separating chambers has the form of a pyramid having its top directed downwardly.

It is furthermore possible that said separating chambers have been connected to the discharge conduit through a portion having a larger cross-sectional surface than the cross-sectional surface of the discharge conduit for the heavy sludge.

For obtaining an effect as good as possible preferably means are provided to spread the mixture evenly over the upper surface of the filter disc. Due to this the fiter disc is loaded as even as possible so that an equal flow of mixture takes place through the entire disc preferably a laminar flow. The oil present in the mixture substantially remains near the surface of said disc and is discharged from there. If it has to be expected that still some oil can penetrate said filter disc than it is simply possible to place one or more further filter discs below the mentioned filter disc. Adjacent the lower side of each of said filter discs the water can be discharged continuously.

A very efficient simple apparatus is obtained when the filter disc is made such that at the desired low flow velocity of the mixture, water does, but oil does not or hardly pass.

As already stated, water eventually together with sludge leaves the lower side of the filter disc with low velocity. The discharge of the sludge preferably takes place with low velocity and as equal as possible over the entire surface of the filter disc or discs. This is achieved in that at or adjacent the bottom of the container spaced from each other one or more perforated sleeves are mounted each of which being connected to the discharge conduit for light sludge, the spaces between the sleeves if necessary being protected by non perforated plates located at a small distance above the sleeves and partly overlapping them.

In case the discharge conduits for the sludge immediately would debouch into the sludge 'pools' would be formed at said mouth due to which a direct connection would be created between the water above the sludge and said mouth (holes are formed in the sludge layer), due to which only water would be discharged but the sludge present around said direct connections (holes) would not or hardly be discharged and obtain the possibility to settle and be not discharged continuously. By connecting said sleeves to the mouth of the sludge discharge conduits, the flow velocity is considerably reduced (less chance to form holes), and the number of discharge places is increased. Due to the lower flow velocity the sludge can move towards the discharge openings which takes place with low velocity. A very effective sludge discharge takes place due to which settling of the sludge is entirely prevented or at least reduced to a very high degree. Due to the fact that the sludge discharge takes place continuously said sludge remains more flowable which avoids settling of the sludge.

The invention now will be further elucidated with reference to the drawings in which the principle of the method and examples of the apparatus of the invention are indicated.

Figure 1:
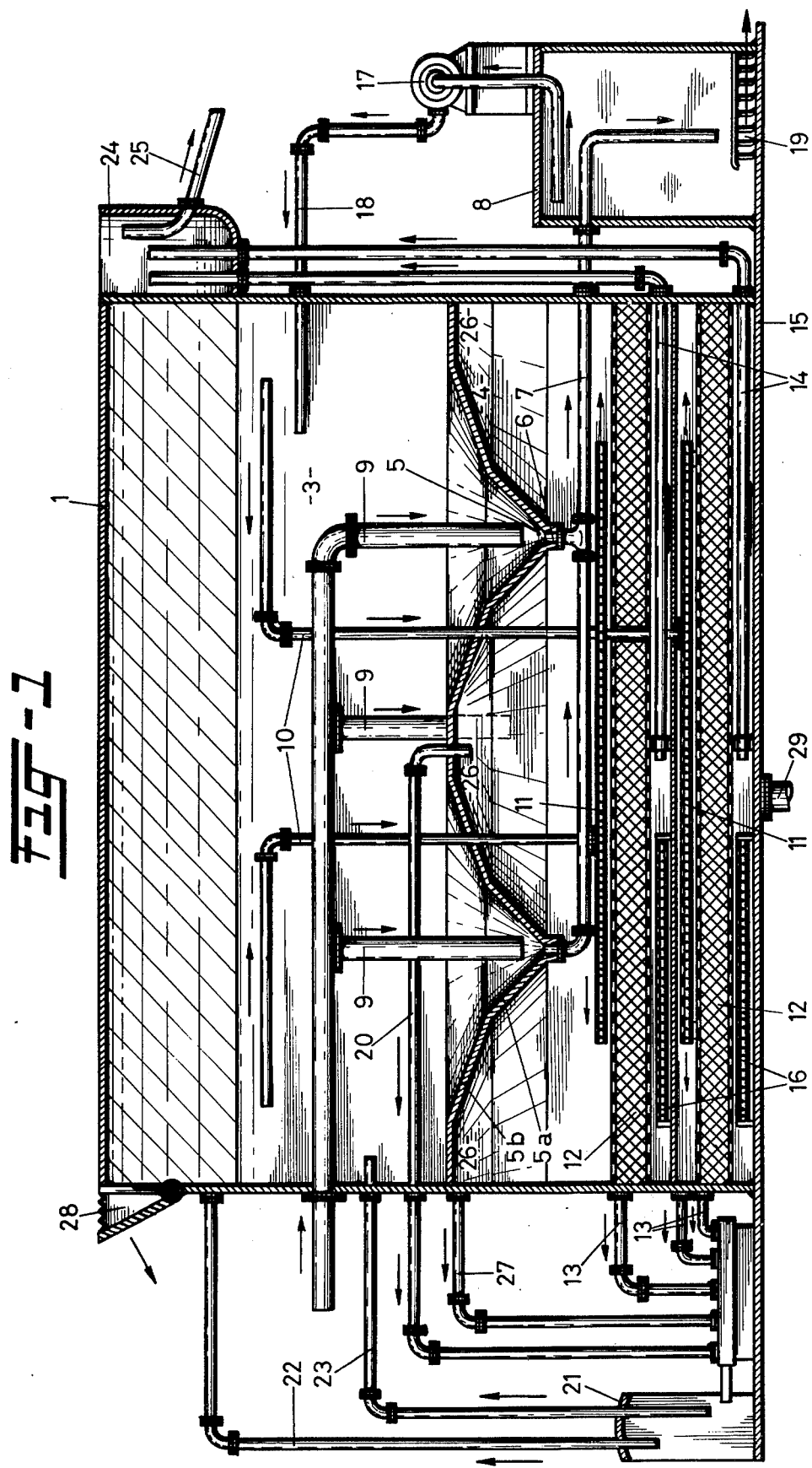
FIG. 1 shows a vertical cross-section to one embodiment of the apparatus according to the invention for large capacity in particular for a shore-installation.

The apparatus comprises a container 1, which by means of a wall 2 is divided into a first chamber 3 and a second chamber 4. In the wall 2 a plurality of upwardly widening separating chambers 5 are provided having at the lower ends openings 6 connected to dischage conduits 7, extending into the heavy sludge collector 8. In each of the chambers 5 a supply conduit 9 debouches, the diameter of which being larger than the diameter of the discharge conduits 7, due to which the mixture to be cleaned is supplied into said chambers in a substantially vertical direction. From a point in the first chamber 3 located above the mouth of the conduits 9 towards a point below the wall 2 conduits 10 extend for the transportation of the mixture freed from the heavy sludge and the majority of oil towards the lower chamber 4 in which the mixture to be treated by the conduits 11 is spread as equal as possible over the filter disc 12 provided in the second chamber 4. As indicated more than one filter disc can be applied to obtain a better separation. Along the upper side of the filter disc 12 conduits 13 are provided for the discharge of remaining oil. Along the lower side of the filter disc conduits 14 are provided for the discharge of cleaned water. Furthermore, adjacent or at the bottom 15 of the container 1 perforated sleeves 16 are provided by means of which sludge can be discharged continuously through conduit 29. Said sludge can be returned to the installation.

The apparatus operates in the following way: Conduits 9 continuously supply mixture to be cleaned towards each of the chambers 5. Since said chambers 5 widen upwardly the flow velocity in the upper direction of the mixture is reduced and heavy sludge can collect at the lower ends of said chambers. This effect is increased in that each of the conical spaces is formed by a cone 5a having its top pointed downwardly the discharge conduit 7 for heavy sludge being connected to said top and further having a truncated cone 5b with larger top angle placed upon it as shown in the drawing. Each lower cone 5a with its downwardly directed top is connected to the conduit 7 through which the heavy sludge is discharged into the sludge collector. The collected heavy sludge is a mixture which in the sludge collector 8 is separated into a oil-water mixture in the upper part, which mixture can be supplied to the first chamber 3 by means of a pump 17 and conduit 18. The heavy sludge collected in the second part is discharged from the system by the sludge discharge 19. From the second chamber 4 the oil separated in said chamber can be supplied by conduits 20,27 to an oil-water separator, from which the oil freed from water can be transferred towards the upper side of the container by the condiut 22 whilst the water can be returned into the container by the conduit 23.

The mixture separated from the heavy sludge in the first chamber 3 is transferred by the conduits 10 towards the second chamber 4 and by the conduits 11 spread equally over the filter disc 12. The flow velocities are very small (e.g. less than 5 mm/sec.). The water flows laminarly through the disc 12, the oil remaining and being supplied by the conduits 13 to the oil-water separator. The water which is cleaned, is discharged from the lower side of said disc through the conduit 14 towards a controllable overflow 24 and from there discharged through conduit 25. Two or more filter discs 12 may be present. The sludge collected below the filter disc (discs) is continuously discharged to other sludge collectors not shown. Because the lower side of the wall 2 has lifted portions like 26 oil can be collected here, which can be discharged through the conduit 27 towards the oil-water separator 21.

The cleaned oil is present in the upper part of the container and can be discharged from there over an adjustable overflow 28. The quantity of oil collected in the first chamber 3 depends on the height of the container above the conduits 10.

Figure 2:
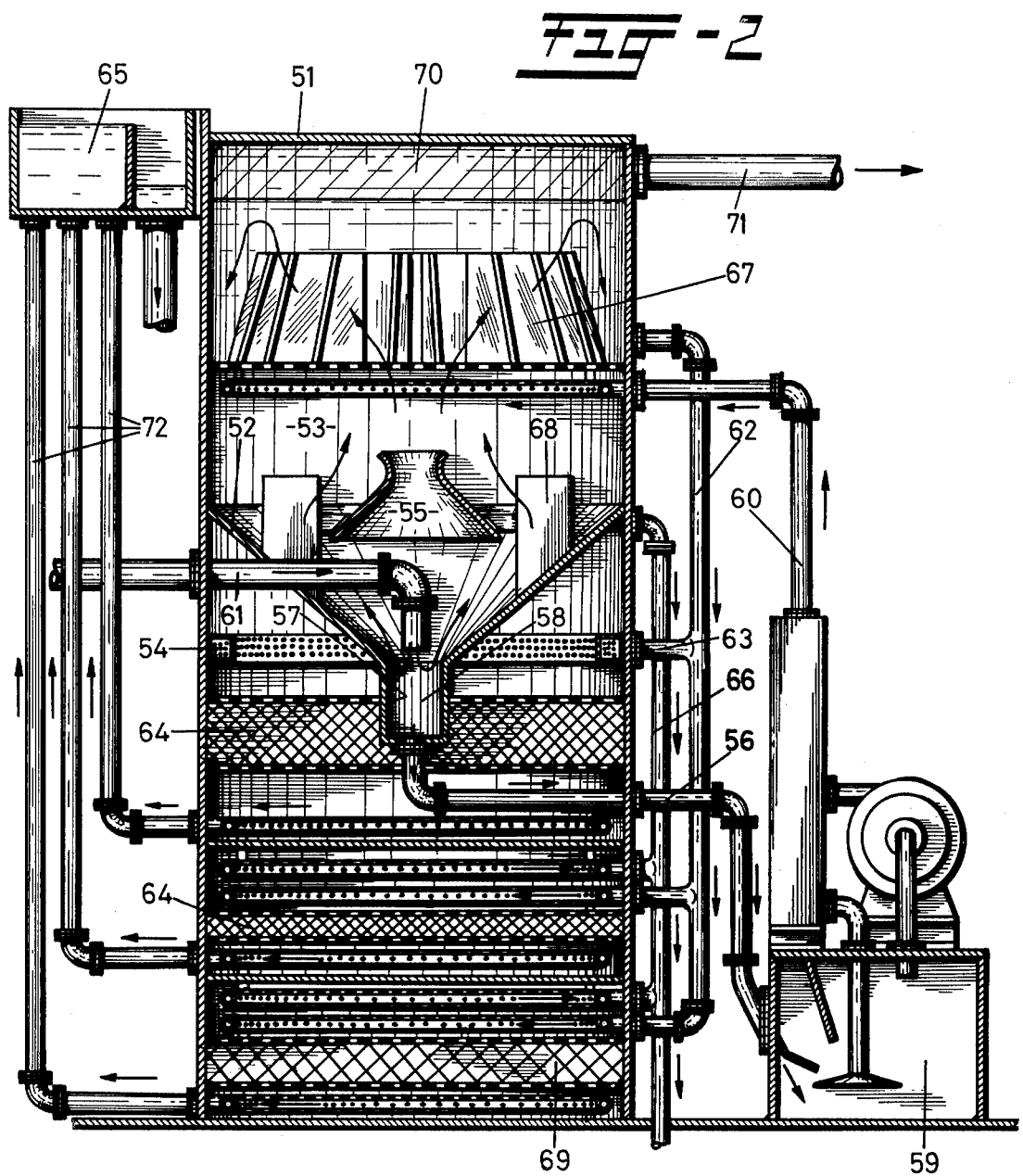
FIG. 2 shows the same cross-section to an embodiment of the apparatus according to the invention with relatively small capacity e.g. an installation which can be placed in a vessel such as a tanker.

The apparatus shown in FIG. 2 comprises a container 51, separated by a wall 52 into a first chamber 53 and a second chamber 54. The wall 52 in this embodiment is shaped such that by it one upwardly widening separating chamber 55 is formed in principle corresponding to the chamber 5 of the embodiment of FIG. 1. At the lower end of said chamber 55 a connecting opening is formed for a discharge conduit 56. Between the top of the separating chamber 55 and the discharge conduit 56 a short connecting channel 57 has been provided, the cross-sectional area of which being larger than that of the discharge conduit so that there a vortex chamber 58 is formed. The discharge conduit 56 has been connected with the heavy sludge collector 59 in which said heavy sludge is further treated and from which lighter fractions moved with the heavy sludge can be returned through the conduit 60 into the apparatus for further treatment. Into the separating chamber 55 the supply conduit 61 debouches due to which the mixture to be separated is supplied into the chamber 55 in a substantially vertical direction.

From a point in the first chamber 53 above the mouth of the conduit 61 towards a point below the wall 52 one or more conduits 62 extend through which the mixture releaved from heavy sludge and the majority of the oil flows towards the lower chamber 54 in which the mixture to be treated by means of conduits 63 is distributed as equal as possible over anti-turbulence filters 64, present in the chamber 54. From the lower side of said anti-turbulence filters through conduits 72 cleaned water is discharged over an overflow 65, whereas from the upper side filters 64 cleaned oil is discharged through conduits 66. The collected oil 70, formed by oil immediately rising from the separating chamber 55 and oil supplied from the second chamber 53 can be discharged through the conduit 71 in a controlled manner from the upper side of the apparatus.

To obtain outside the separating chamber 55 a flow which as quiet as possible so that the separation of oil and water takes place as efficient as possible at different places antiturbulence members are arranged in the apparatus such as the plates 67,68 and 69. The last mentioned plates 69 are collected into a coarse screen and serve to allow fine sludge to settle. Said sludge can be discharged in the same way as indicated in the embodiment of FIG. 1.

The operation of this embodiment of the apparatus according to the invention corresponds to the operation of the first mentioned embodiment, so that this needs not to be explained further.

It will be clear that with the method and apparatus according to the invention a continuously operating oil-water-sludge separator has been provided not having the disadvantages of the known methods and apparatus.

It also will be clear that the principle underlying the present invention can be realized in many different ways. Thus it is possible for instance to place the sludge collector 8 within the container so that a simple costs and space saving arrangement is obtained, since in the first place a lighter construction can be applied for the sludge collector and in the second place the ground surface for the apparatus is reduced.

The container also can be made with the first and second chamber side by side and not on top of each other (vide for this the drawing).

Furthermore the substantially horizontal walls and members shown in the drawing can be placed at a slight angle.

A further particularity of the apparatus according to the invention is that the filters and the walls can rest loosely upon supports so that assembly and if necessary disassembly can take place in a very simple way.

I claim:

1. Apparatus for separating the components of a mixture of water, oil and sludge on the basis of their differing physical properties, comprising a container, a conduit for the supply of the mixture to be treated, a conduit for the discharge of oil separated in the upper part of the container and a conduit for the discharge of water separated from and collected below the oil, the container being divided into a first chamber and a second chamber positioned generally below said first chamber, the bottom of the first chamber being provided with one or more upwardly widening separating chambers into each of which a supply conduit debouches for the mixture to be separated and a discharge conduit for heavy sludge being connected to the narrow part of said one or more upwardly widening separating chambers, said discharge conduit being dimensioned to have a flow capacity corresponding to the sludge volume supply, whereas one or more conduits are provided connecting the first chamber and the second chamber, said conduit or conduits having upper inlets positioned above the level of the mouthes of the supply conduits for the transfer of light fractions of the mixture from the first chamber to the second chamber and upper side of a filter disc or package formed by a plurality of filter discs, said second chamber having conduits for the discharge of separated oil from the upper side of the filter disc or discs, for the discharge of cleaned water and for the discharge of sludge adjacent to the lower side of said filter disc or discs.

2. Apparatus according to claim 1, wherein each of the separating chambers has the form of a cone having its top directed downwardly.

3. Apparatus according to claim 1, wherein each of the separating chambers has the form of a pyramid having its top directed downwardly.

4. Apparatus according to claim 2 or 3, wherein each of said separating chambers has been connected to the discharge conduit through a portion having a larger cross-sectional surface than the cross-sectional surface of the discharge conduit for the heavy sludge.

5. Apparatus according to claims 2, 3 or 4, further comprising means for spreading the mixture evenly over the top surface of the filter disc.

6. Apparatus according to claims 1, 2 or 3, wherein the filter disc has been made such that with the desired low flow velocity of the mixture water does pass but oil does not pass or hardly passes.

7. Apparatus according to claims 1, 2 or 3, further comprising one or more spaced apart perforated sleeves arranged at or adjacent the bottom of the container each of which is connected to the discharge conduit for light sludge, the spaces between said sleeves being protected by non perforated plates placed at a small distance above the sleeve and partly overlapping them.

8. Apparatus according to claims 1, 2 or 3, wherein the sludge is guided towards one or more sludge separators which are mounted within the container.

9. Apparatus according to claims 1, 2 or 3, wherein the filters and the walls loosely rest upon supports.

* * * * *